US006523464B1

(12) United States Patent
Widelo

(10) Patent No.: US 6,523,464 B1
(45) Date of Patent: Feb. 25, 2003

(54) AUTOMATED PEELER

(76) Inventor: Ronald J. Widelo, 326 West St., Hatfield, MA (US) 01066

( * ) Notice: Subject to any disclaimer, the term of this patent is extended or adjusted under 35 U.S.C. 154(b) by 0 days.

(21) Appl. No.: 10/244,498

(22) Filed: Sep. 16, 2002

Related U.S. Application Data

(60) Provisional application No. 60/323,495, filed on Sep. 19, 2001.

(51) Int. Cl.[7] ............................. A23N 7/00; A47J 17/00; A47J 17/14; A47J 17/16
(52) U.S. Cl. ............................. 99/541; 99/590; 99/593; 99/594; 99/599
(58) Field of Search ........................... 99/539–541, 584, 99/588–599; 426/481–483

(56) References Cited

U.S. PATENT DOCUMENTS

| 16,080 | A | * | 11/1856 | Pratt | 99/590 |
|---|---|---|---|---|---|
| 242,660 | A | * | 6/1881 | Law | 99/598 |
| 430,139 | A | * | 6/1890 | Meyer | 99/598 |
| 633,932 | A | * | 9/1899 | Williamson | 99/598 |
| 836,140 | A | * | 11/1906 | Radsch | 99/598 |
| 1,006,621 | A | * | 10/1911 | Arnold | 99/590 X |
| 1,256,751 | A | * | 2/1918 | Wenzel | 99/598 |
| 2,130,980 | A | * | 9/1938 | Chattin et al. | 99/596 |
| 2,483,930 | A | * | 10/1949 | Pauls | 99/596 X |
| 3,152,436 | A | * | 10/1964 | Chesley | 99/594 X |
| 3,881,406 | A | * | 5/1975 | Perez | 99/541 X |
| 4,287,820 | A | * | 9/1981 | Urban | 99/593 X |
| 4,753,159 | A | | 6/1988 | Eaton | |
| 4,765,234 | A | | 8/1988 | Cailliot | |
| 4,936,204 | A | | 6/1990 | Whitmarsh | |
| 5,097,758 | A | * | 3/1992 | Fresh | 99/590 |
| 5,690,022 | A | | 11/1997 | Chai | |
| 6,125,744 | A | | 10/2000 | Martin | |

* cited by examiner

*Primary Examiner*—Timothy F. Simone
(74) *Attorney, Agent, or Firm*—Malcolm J. Chisholm, Jr.

(57) ABSTRACT

The invention is an automated peeler for peeling vegetables or fruit. The peeler includes a split axle support for securing and rotating an object to be peeled within a frame, and a peeling blade supported on an articulating peeler blade mount secured through a blade arm to a peeler support. As the peeler support is driven along a peeler carriage, a torsion drive forces the peeler blade against the rotating object. The articulating peeler blade mount permits the peeling blade to track an irregular surface of a vegetable such as a butternut squash. The peeling blade comprises an arcuate cutting surface having at least one blade tip extending above a throughbore defined in the surface of the peeling blade so that a peel of the object passes through the throughbore defined in the peeling blade.

17 Claims, 8 Drawing Sheets

AUTOMATED PEELER

CROSS REFERENCE TO RELATED APPLICATION

This Application claims the benefit of U.S. Provisional Application Serial No. 60/323,495 filed on Sep. 19, 2001.

TECHNICAL FIELD

The present invention relates to apparatus for peeling vegetables and fruit, and relates in particular to apparatus for peeling vegetables, such as butternut squash and turnip that have irregular or tough exterior skin surfaces.

BACKGROUND OF THE INVENTION

It is well known for apparatus that peel vegetables and fruit to utilize an axle-like support to secure and rotate the object to be peeled while a peeling device supported by a mechanical arm moves along an exterior surface of the object. For example, as shown in U.S. Pat. No. 3,881,406 to Perez that issued on May 6, 1975, in U.S. Pat. No. 5,690,022 to Chai that issued on Nov. 25, 1997, and in U.S. Pat. No. 6,125,744 to Martin that issued on Oct. 3, 2000, similar devices support and rotate an object to be peeled while a cutting assembly moves along the exterior surface of the vegetable or fruit. While such devices are capable of adequately peeling specific vegetables, it is also known that they involve complex machinery that is costly to operate and maintain. For example, many such machines require a flow of cleaning fluid such as water to be directed to the area to be peeled to move cut peels away from the object being peeled to enhance subsequent processing of the object.

Additionally, known automatic peelers cannot efficiently peel vegetables or fruit having a non-spherical exterior surface, or having a thick, leathery or tough exterior surfaces. Known automated peelers utilized to peel butternut squash, which has an elongate stem section and a larger spherical section, utilize complicated spinning cutters in order to effectively cut the tough skin of the squash over its irregular surface. Such spinning cutters are very noisy, expensive to operate and maintain, and pose a safety risk to both an operator of the peeler and consumers of the peeled squash whenever a spinning cutter ejects a broken portion of the cutter either away from the peeler apparatus or into the squash. Additionally, in order for the spinning cutter to track the irregular butternut squash surface, it effectively cuts away a significant portion of the squash, which is lost for subsequent processing of the squash.

Accordingly, there is a need for an automated peeler that can efficiently peel an object such as a butternut squash and other fruits or vegetables having irregular and/or tough exterior surface skin.

SUMMARY OF THE INVENTION

The invention is an automated peeler for automatically peeling vegetables or fruit. The peeler includes a frame having a first end and an opposed second end; a peeler carriage supported by the frame extending between the first and second ends of the frame; a peeler support adjustably secured to the peeler carriage so that the peeler support may move between the first and opposed second ends of the frame; a split support axle rotatably secured between the first and second ends of the frame for supporting and rotating an object to be peeled; a motor drive mechanically coupled to the peeler carriage for selectively moving the peeler support along the peeler carriage, and mechanically coupled to the split support axle for rotating the object to be peeled. The peeler support includes a blade arm having a first end and an opposed second end, and the first end is adjustably secured to a torsion driver that drives the second end of the blade arm toward the split support axle. An articulating blade mount is secured to the second end of the blade arm, and the articulating blade mount is secured to the second end of the blade arm so that the blade mount may pivot about an axis defined as extending between the first and opposed second ends of the blade arm. A peeling blade is secured to the articulating blade mount. The peeler support and split support axle are cooperatively positioned so that whenever the peeler support is driven along the peeler carriage by the motor drive, the peeling blade may be selectively positioned by the torsion driver to contact and peel the object to be peeled as the motor drive means rotates the split support axle and object to be peeled.

Because the articulating blade mount may articulate or pivot about the axis between the first and second ends of the blade arm, the peeling blade rotates or pivots to track a surface contour of the object being peeled such as a butternut squash, instead of cutting deeply into, or failing to peel an irregular surface of the object.

In a preferred embodiment, the peeling blade comprises an arcuate cutting surface having at least one blade tip extending above a throughbore defined in the arcuate cutting surface of the peeling blade at a point on the surface that is farthest from the articulating blade mount and that is also closest to the object to be peeled. Therefore, as the object to be peeled rotates within the split support axle against the blade tip, a peel of the object passes through the throughbore defined in the peeling blade. The peeling blade may be positioned relative to the object being peeled so that gravity causes the peel passing through the throughbore to pass away from the peeling blade and object in the direction of the force of gravity.

In a further preferred embodiment, the peeling blade may include a plurality of rows of blade tips including one or two blade tips that extend above throughbores defined within the arcuate surface to define a central ridge of blade tips along the arcuate cutting surface, which central ridge includes blade tips that are defined within the arcuate surface as farthest from the articulating blade mount and closest to the object to be peeled, and the peeling blade defines a first shoulder ridge and a second shoulder ridge parallel to and on opposed sides of the central ridge of blade tips wherein the first and second shoulder ridges define throughbores having no blade tips. As the object to be peeled rotates against the peeling blade, the blade tips in a row of the central ridge peel the fruit, while the shoulder ridges contact the object being peeled thereby preventing the blade tips of the central ridge from penetrating the object beyond a desired depth defined as a shortest distance between the blade tips of the central ridge and the arcuate surface defining the shoulder ridges.

In an alternative embodiment, the torsion driver may be a spring-loaded, hydraulic actuator, such as a standard door opener, that includes a tensioned open position; a forced closing movement; and, that also includes an adjustable force setting to adjust the force applied during the forced closing movement through the blade arm to the peeling blade to adjust the automated peeler for varying vegetables or fruits. Additionally, the articulating blade mount may include an adjustable biasing structure, such as a coiled spring, to provide varying sensitivity of pivoting of the peeling blade as it tracks an irregular surface of the object being peeled.

In a further preferred embodiment, the peeler support may be engaged to and moved along the peeler carriage by a manually actuated split-nut clamp that includes a cylindrical nut having internal threading dimensioned to mate with threading of a carriage screw that is rotated by the motor. The cylindrical nut is split length wise, and each half is secured to opposing clamps of a hand clamp having a cam fastening structure, such as the well-known "VICE GRIP" brand hand clamp. The split-nut clamp is secured to the peeler support, and whenever the object to be peeled is rotating, and the peeling blade is positioned by the torsion driver against a beginning end of the object to be peeled, an operator manually closes the split-nut clamp so that each half of the split nut closes upon and mates with the spinning carriage screw, and the split-nut clamp thereby causes the peeler support and attached peeling blade to move along the peeler carriage as the peeling blade peels the object. Whenever the object is peeled, the operator simply opens the split-nut clamp to disengage the peeler support from the carriage screw, and then the peeler support may be manually moved back to position the peeling blade to peel another object to be peeled that is secured within the split support axle.

In a further preferred embodiment, the peeling blade may be a common carpenters half-round file blade, such as sold under the brand name or trademark "SURFORM", model number 5-21-299, sold by the Stanley Tools Company of New Britain, Conn., U.S.A., wherein the shoulder ridges are formed by filing down to a flat surface the blade tips adjacent the one or two central blade tips that define the central ridge of blade tips. Additionally, the articulating blade mount that secures the peeling blade may be adjustable, so that after one or two rows of blade tips are utilized, the blade may be moved within the blade mount so that the next one or two rows of blade tips are positioned to contact the object to be peeled. In this way, a standard half-round file may be adjusted approximately 40 times to extend a useful life of the peeling blade.

Accordingly, it is a general object of the present invention to provide an automated peeler that overcomes deficiencies of prior art peelers of vegetables and fruits.

It is a more specific object to provide an automated peeler that is inexpensive to manufacture, operate and maintain.

It is yet another object to provide an automated peeler that may efficiently peel vegetables having irregular shapes and/or tough, leathery skins.

It is a further object to provide an automated peeler that may be readily adjusted to peel a variety of differing vegetables and fruits.

These and other objects and advantages of this invention will become more readily apparent when the following description is read in conjunction with the accompanying drawings.

DESCRIPTION OF THE PREFERRED EMBODIMENTS

Figure 1:
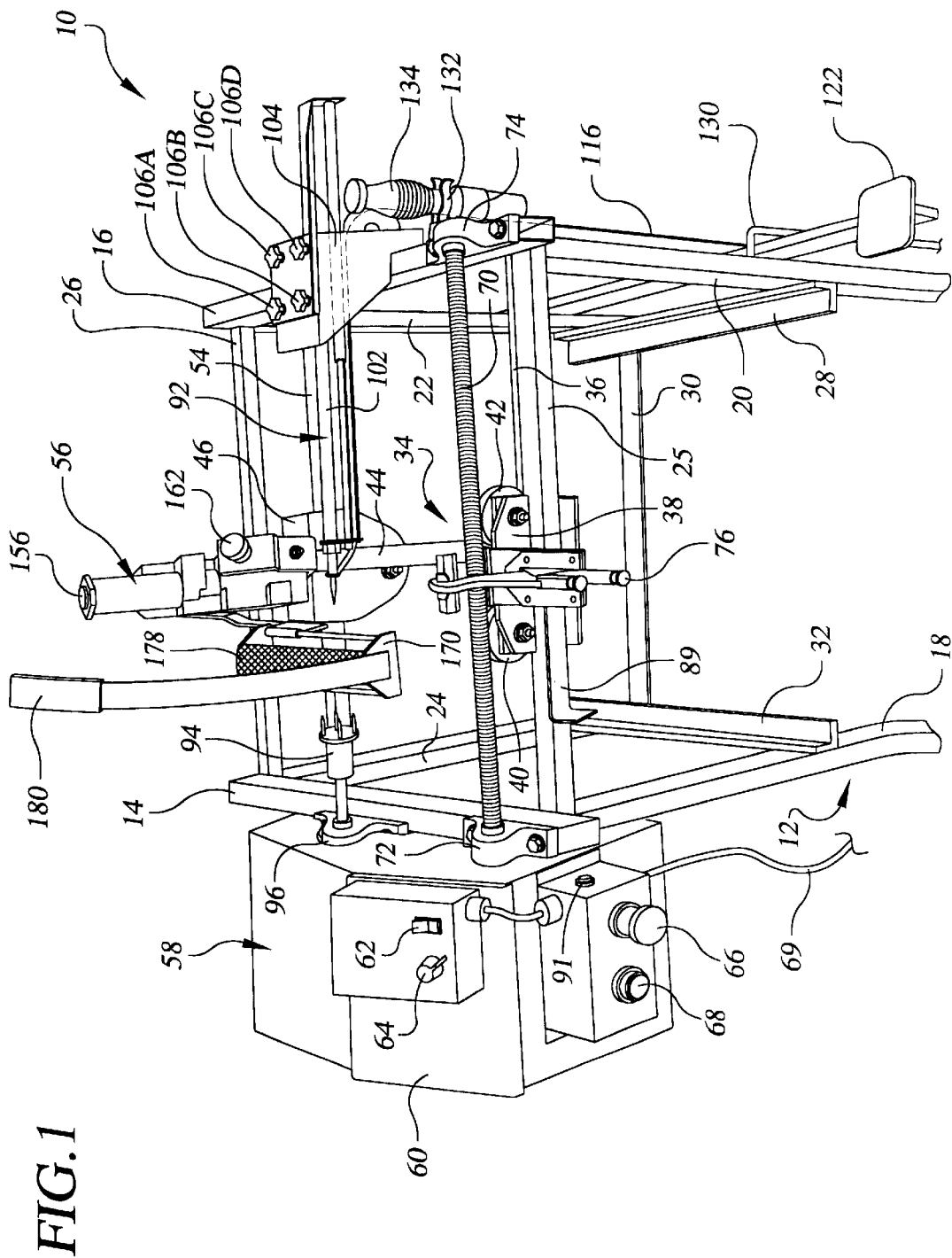
FIG. 1 is a front perspective view of an automated peeler constructed in accordance with the preset invention.

Referring to the drawings in detail, an automated peeler constructed in accordance with the present invention is shown in FIGS. 1–8, and is generally designated by the reference numeral 10. The automated peeler 10 includes a frame 12 having a first end 14 and an opposed second end 16. The frame 12 also includes four legs 18, 20, 22, 24, a front support 25 and a rear support 26 extending between the first and second ends 14, 16 of the frame 12, and lower supports 28, 30, 32 extending between the legs 18, 20, 22, 24.

A peeler carriage 34 is secured to and supported by the frame 12 and the carriage 34 extends between the first and second ends 14, 16. The peeler carriage 34 includes front roller bar 36 extending between the first and second ends 14, 16 of the frame 12; a front roller housing 38 that secures a first front roller 40 and a second front roller 42 so that they roll along the front roller bar 36; a cross member 44 secured between the front roller housing 38 and a back roller housing 46; wherein the back roller housing 46 secures a first back roller 48, second back roller 50 and third back roller 52 (seen in FIG. 3) to a back roller bar 54 that extends between the first and second ends 14, 16 of the frame 12.

A peeler support 56 is secured to the back roller housing 46 of the peeler carriage 34 so that the peeler support 56 may be driven along the front and back roller bars 36, 54 of the peeler carriage 34 between the first and second ends 14, 16 of the frame 12. The peeler support 56 may be driven between the first and second ends 14, 16 of the frame 12 by way of a standard motor drive means 58 for rotating shafts, such as an electrical motor well known in the art. The motor drive means 58 may be secured within a water proof motor housing 60 secured to the first end 14 of the frame 12 having a standard on-off switch 62, speed control switch 64, operator emergency kill switch 66, a lighted on-off switch 68 (being lighted for on), and an electrical power supply cord 69.

The motor drive means 58 is mechanically coupled to a threaded carriage screw 70 that is secured between the first and second ends 14, 16 of the frame by a first pillar block screw bearing mount 72 and a second pillar block screw bearing mount 74. The motor drive means 58 rotates the carriage screw 70 which is mechanically coupled to the peeler carriage 34 to move the peeler support 56 between the first and second ends 14, 16 of the frame. The motor drive means 58 is mechanically coupled either directly, or through standard gears, sprockets and/or chains (not shown) within the motor housing 60 to the carriage screw 70 so that the carriage screw 70 rotates between 1 and about 65 r.p.m. An acceptable carriage screw 70 is sold by the McMaster Carr Supply company of Dayton, N.J., under the model number 97014A170, as a three-quarter inch-six acme thread, made of "316 stainless steel".

The peeler carriage 34 may be mechanically coupled to the carriage screw 70 by way of a split-nut clamp 76. As shown best in FIGS. 2 and 2A, the split-nut clamp 76 includes a first half cylindrical nut 78 and a matching second half cylindrical nut 80. The half nuts 78, 80 define internal threads 81 that mate with threads of the carriage screw 70. The first half cylindrical nut 78 is secured to a pivoting arm 82 and attached hand grip 83 of a hand clamp 84, and the second half cylindrical nut 80 is secured to a base plate 86 pivotally secured to the front roller housing 38. A fixed arm 88 of the hand clamp 84 includes a mount plate 90 secured to the base plate 86 and a connecting lever 93 secured between the hand grip 83 and the fixed arm 88.

Figure 2:
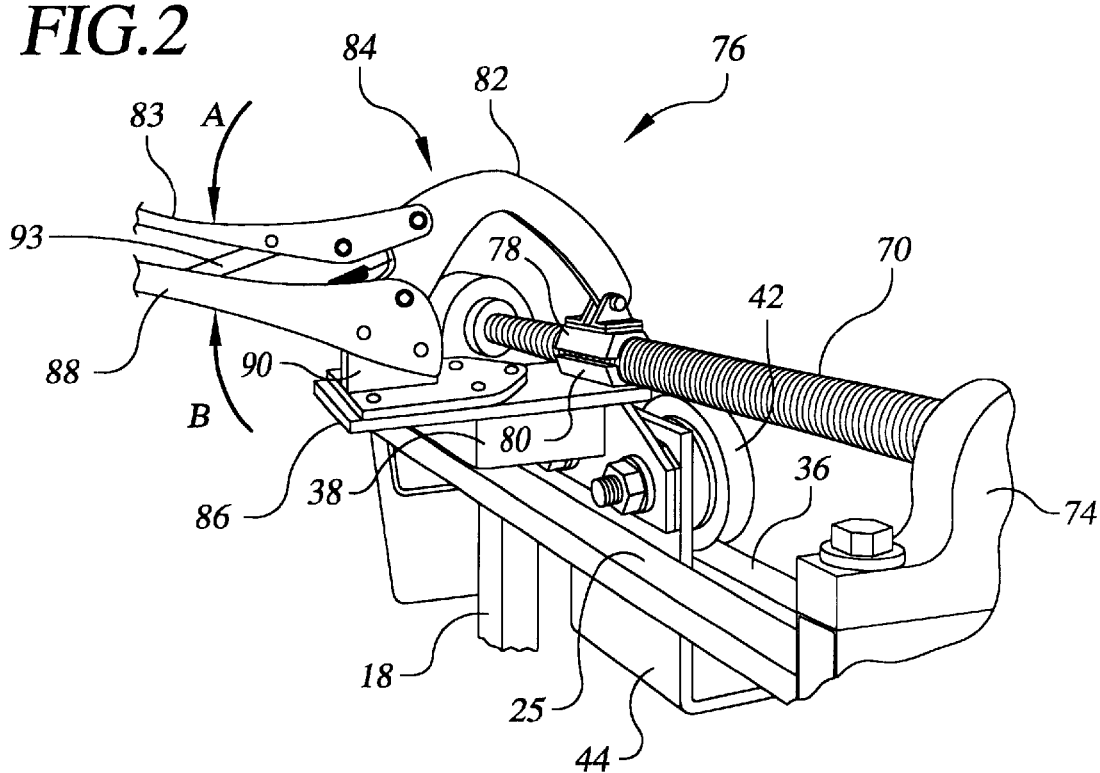
FIG. 2 is a fragmentary, perspective view of a split-nut clamp of the automated peeler, showing the split-nut clamp in a closed position.
Figure 2A:
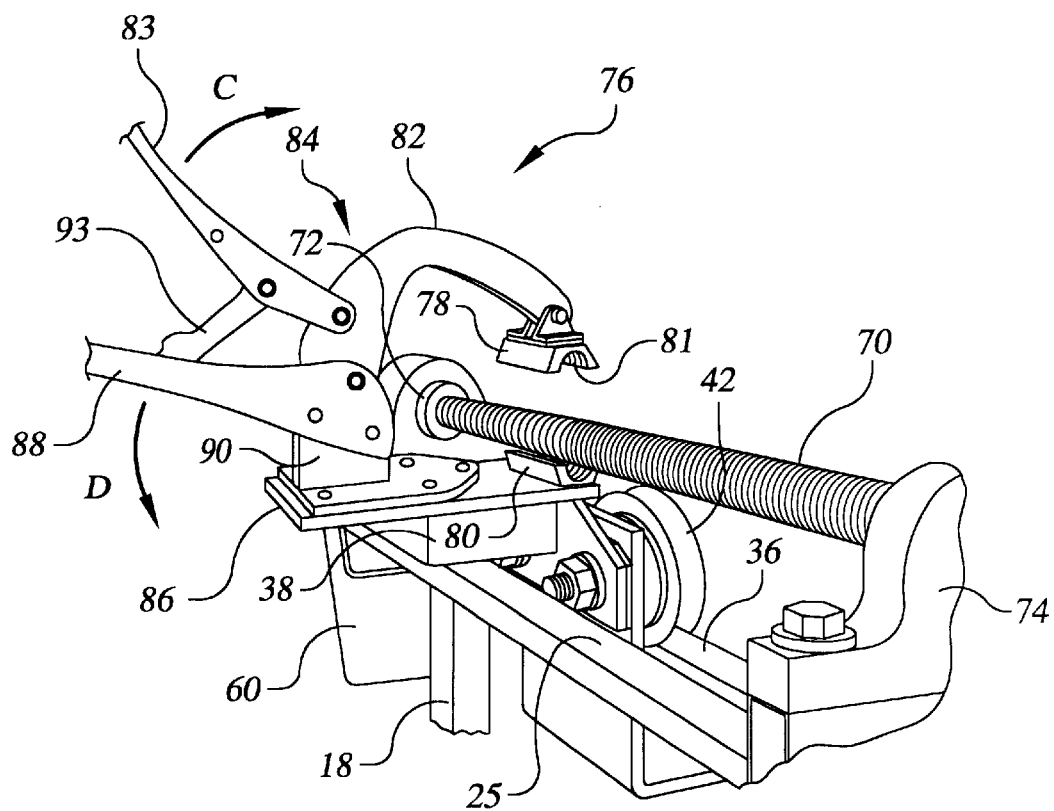
FIG. 2A is a fragmentary, perspective view of the FIG. 2 split-nut clamp, showing the split-nut clamp in an open position.

By moving the pivot arm 82 and fixed arm 88 together in a direction as shown by the directional arrows A and B in FIG. 2, the hand clamp 84 closes, so that the two half nuts 78, 80 move to clamp the carriage screw 70 and the internal threads 81 the two half nuts 78, 80 engage the threads of the carriage screw 70. Therefore, whenever the clamp 84 is closed and the motor drive means 58 is rotating the carriage screw 70, the split-nut clamp 76 moves along the carriage screw 70, thereby moving the attached front roller housing 38 of the peeler carriage 34, which causes the peeler support 56 to also move between the first and second ends 14, 16 of the frame 12. To stop movement of the peeler support 56 between the first and second ends 14, 16 of the frame, an operator (not shown) simply moves the pivot arm 82 and fixed arm 88 away from each other in a direction shown by directional arrows C and D, of FIG. 2A, so that the two half nuts 78, 80 move out of engagement with the carriage screw 70.

As best seen in FIG. 1, an auto-stop switch actuator bar 89 is adjustably secured to the front roller housing 36 extending toward the motor drive means housing 60 so that the bar 89 contacts and activates an auto-stop switch 91 whenever the front roller housing 36 moves along the carriage screw 70 to a pre-determined position. When the auto-stop switch 91 is activated, the motor 58 stops rotating the carriage screw 70 to stop any further movement of the front roller housing 36 and peeler support 56.

The hand clamp 76 may be any standard manually actuated, spring loaded clamp including a cam roller to facilitate locking of the hand clamp 76, such as hand clamps commonly sold under a trademark "VICE GRIP". An exemplary hand clamp 76 is sold under the trademark "GRIP-ON", model no. 222-12, manufactured by the Grip-On Company in the nation of Spain. It is also noted that, as known in the art, the hand clamp 76 would include a standard adjustment mechanism, thereby providing for adjustment of the hand clamp 76 to compensate for thread wear of the carriage screw 70 and the first and second half cylindrical nuts 78, 80. The hand clamp 76 may thereby be adjusted to provide for a 0.002 inch clearance to enhance and prolong performance of the automated peeler 10.

Referring again to FIG. 1, a split support axle 92 is rotatably secured between the first end 14 and second end 16 of the frame, and includes a first axle segment 94 rotatably secured to the first end 14 of the frame 12 by a first axle mount bearing 96, and mechanically coupled to the motor drive means 58. The first axle segment 94 is mechanically coupled to the motor drive means 58 by way of standard gears, sprockets and/or chains known in the art (not shown) within the motor housing 60, so that the first axle segment may selectively rotate between one and sixty revolutions per minute ("R.P.M."). The first axle segment 94 includes a plurality of mounting spikes 98A, 98B, 98C and 98D (shown best in FIG. 3) on a restriction collar 99 of the first axle segment 94 for securing an object to be peeled 100, such as a turnip or rutabaga (shown in FIG. 4) so that the object only rotates as the first axle segment 94 rotates.

Figure 8:
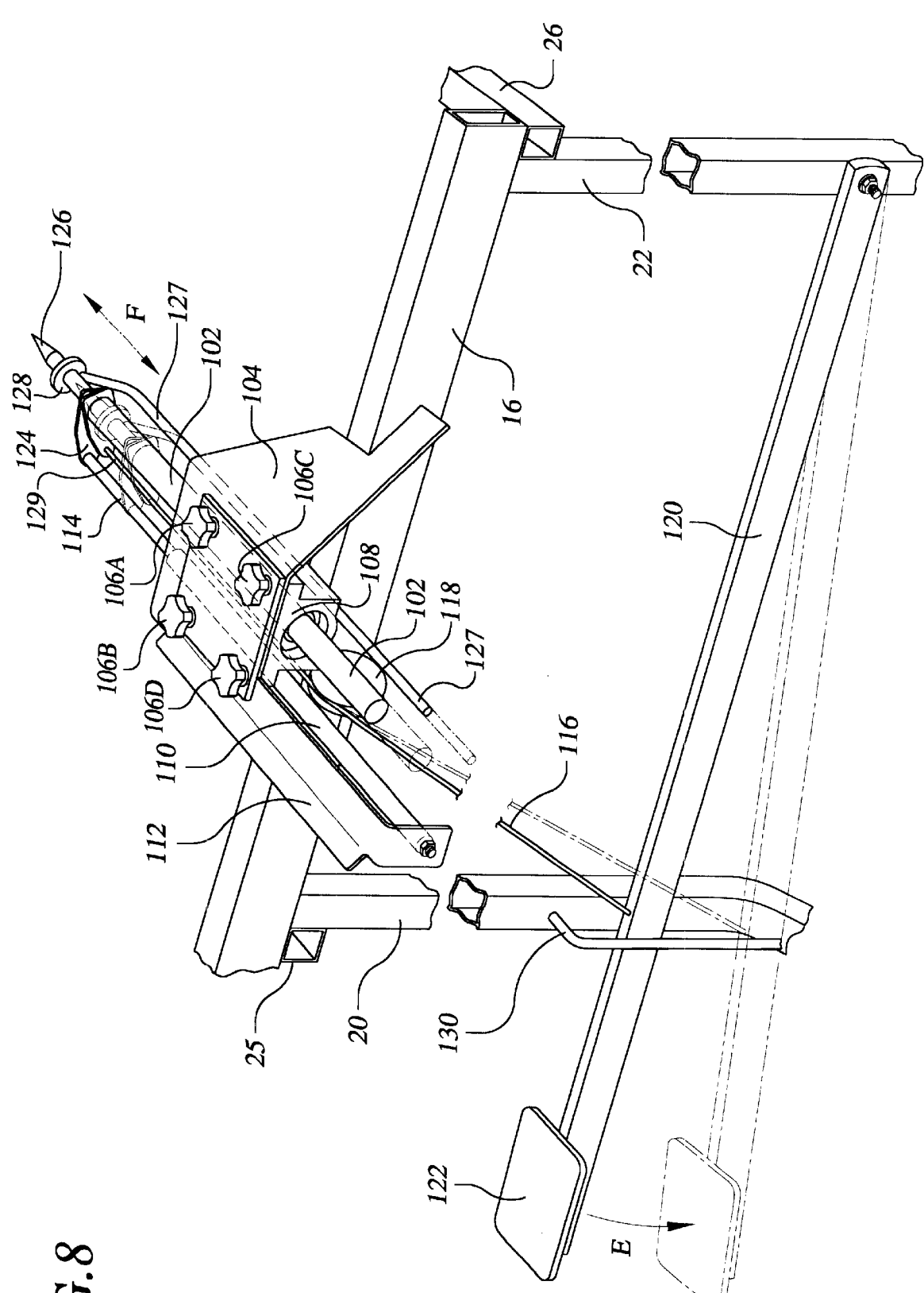
FIG. 8 is a fragmentary, perspective side view of the FIG. 1 automated peeler showing a foot-pedal loading mechanism.

The split support axle 92 also includes a second axle segment 102 that is retractably secured to the second end 16 of the frame 12 by a tunnel mount 104 that includes a plurality of mount adjustment screws 106A, 106B, 106C, and 106D. As best shown in FIG. 8, the tunnel mount 104 includes a guide sleeve 108 that houses the retractable second axle segment 102. The tunnel mount 104 may also secure a biasing means for retractably driving the second axle segment 102 toward the first axle segment 94 in order to secure the object to be peeled 100 between the first and second axle segments 94, 102. The biasing means may be any mechanism known in the art for driving an axle like device in one linear direction, such as for example, a spring cylinder 110 secured to a cylinder mount flange 112 of the tunnel housing 104 in parallel alignment with the second axle segment 102. The spring cylinder 110 may be any common spring cylinders known in the art that include a coiled spring (not shown) secured within a cylindrical housing to an extension rod 114, such as are commonly found in modern automobiles to hold up rear windows of "mini-van" types of passenger vehicles. Such spring cylinders often include pneumatic sealing and a pneumatic valve to prevent rapid extension or compression of the extension rod 114.

The spring cylinder 110 is mounted coaxial with the second axle segment 102, and includes a compression cable 116 secured over a pulley wheel 118 between the extension rod 114 and a pivoting strut 120 that has a foot pedal 122. The pivoting strut 120 is pivotally secured to the frame 12, such as at leg 22. By the operator (not shown) stepping downward in the direction of directional arrow E (in FIG. 8) on the foot pedal 122, the compression cable 116 compresses the extension rod 114 into the spring cylinder 110. The extension rod 114 includes a connector plate 124 securing the extension rod 114 to the second axle segment 102, so that compressing the extension rod 114 by stepping on the foot pedal 122 moves the second axle segment 102 away from the first axle segment 94. An operator may then position the object to be peeled 100 on the mounting spikes 98A, 98B, 98C, 98C of the first axle segment, and then let up on the foot pedal 122, so that the extension rod 114 of the spring cylinder 110 pushes a securing spike 126 of the second axle segment 102 into the object to be peeled 100. The securing spike 126 also includes a second restriction collar 128 so that the securing spike 126 will not penetrate too far into the object to be peeled 100. The motor drive means 58 may then be activated to rotate the first axle segment 94 of the split axle 92, so that it rotates along with the object to be peeled 100. To remove the object to be peeled, the operator simply places a hand under the object to be peeled 100, and then depresses the foot pedal 122 to extract the second axle segment 102 from the object 100.

A first guide rod 127 may also be secured between the securing spike 126 and the guide sleeve 108 to assist in keeping the second axle segment 102 properly aligned against partially lateral pulling of the spring cylinder 110. Similarly, a second guide rod 129 may be secured between the connector plate 124 and the guide sleeve 108 to assist in maintaining the extension rod 114 and spring cylinder 110 in alignment with the second axle segment 102.

A foot pedal guide 130 may also be secured to the leg 20 so that the foot pedal 122 is between the leg 20 and the guide 130 in order to guide the foot pedal 122 from excessive lateral movement. Returning to FIG. 1, it is noted that a brush mount 132 may be secured to the frame 12 at a convenient location to secure a hand brush 134 for cleaning components of the automated peeler 10.

A preferred motor drive means 58 may be a standard electric motor, such as an electric motor sold by the Baldor Company, of Fort Smith Ark., U.S.A., with the catalog number of GP7409 that is ¼ horsepower, 90 volts direct current and 2 amps, operated at a range of 0–20 revolutions per minute. The electric motor can therefore be operated on a standard 110 volt supply that is converted to direct current for variable speed control. The electric motor is mechanically coupled either directly or by way of common gears, sprockets and/or chains (not shown) to the carriage screw 70 so that the carriage screw rotates between 0 and about 64 r.p.m. Alternative motor drive means may include any known apparatus that can move the peeler support 56 along the peeler carriage 18, and that can rotate the split support axle 92, such as known hydraulic motors and valves, pneumatic motors and valves, etc., including motor drive means for moving the peeler support 56 and split support axle 92 separately through two separate motor drive means, or together by way of one motor drive means utilizing standard mechanical coupling through chains and gears, or alternatively utilizing fluid hoses and control valves, etc.

Figure 3:
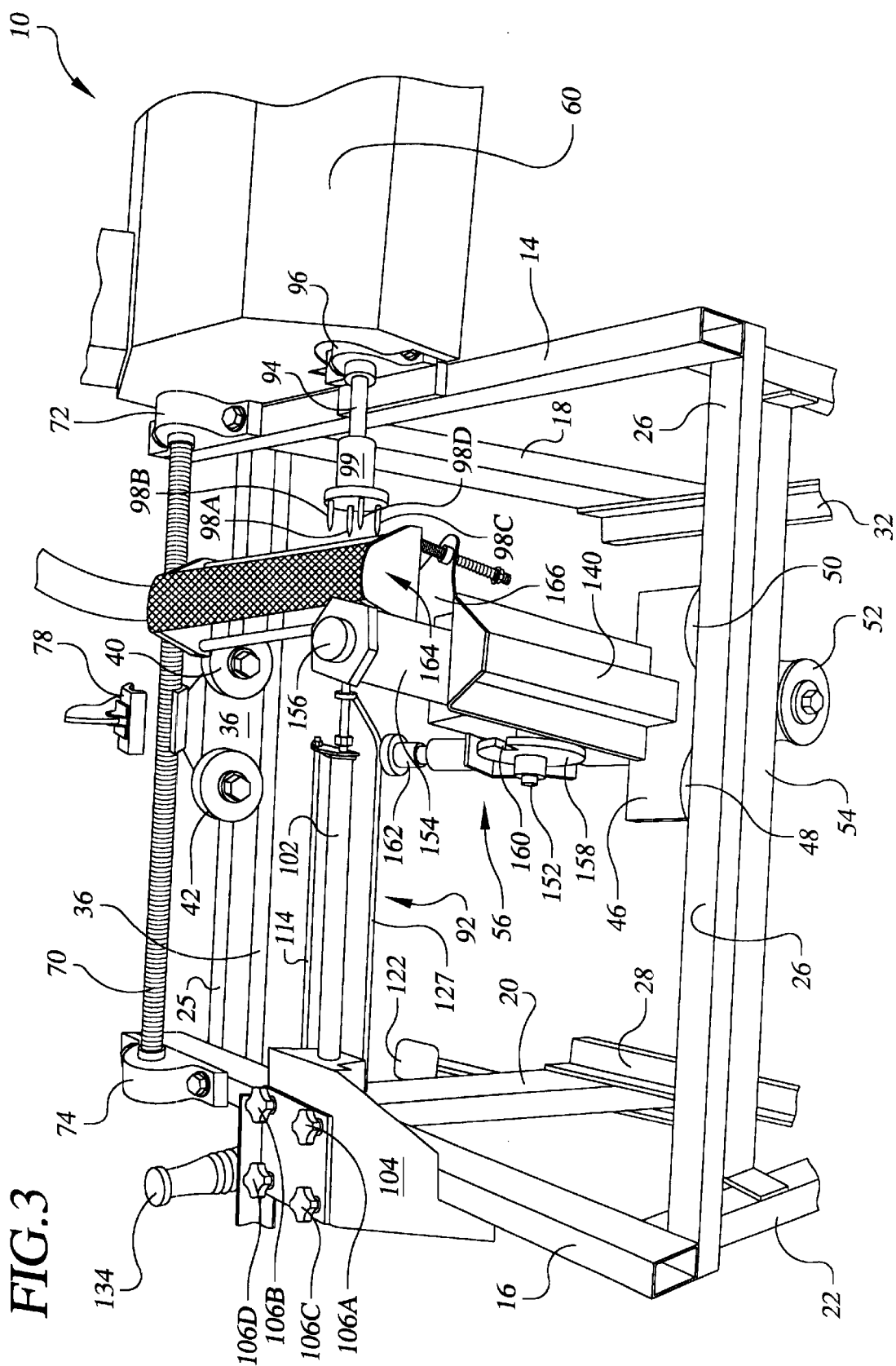
FIG. 3 is a back perspective view of the FIG. 1 automated peeler.
Figure 4:
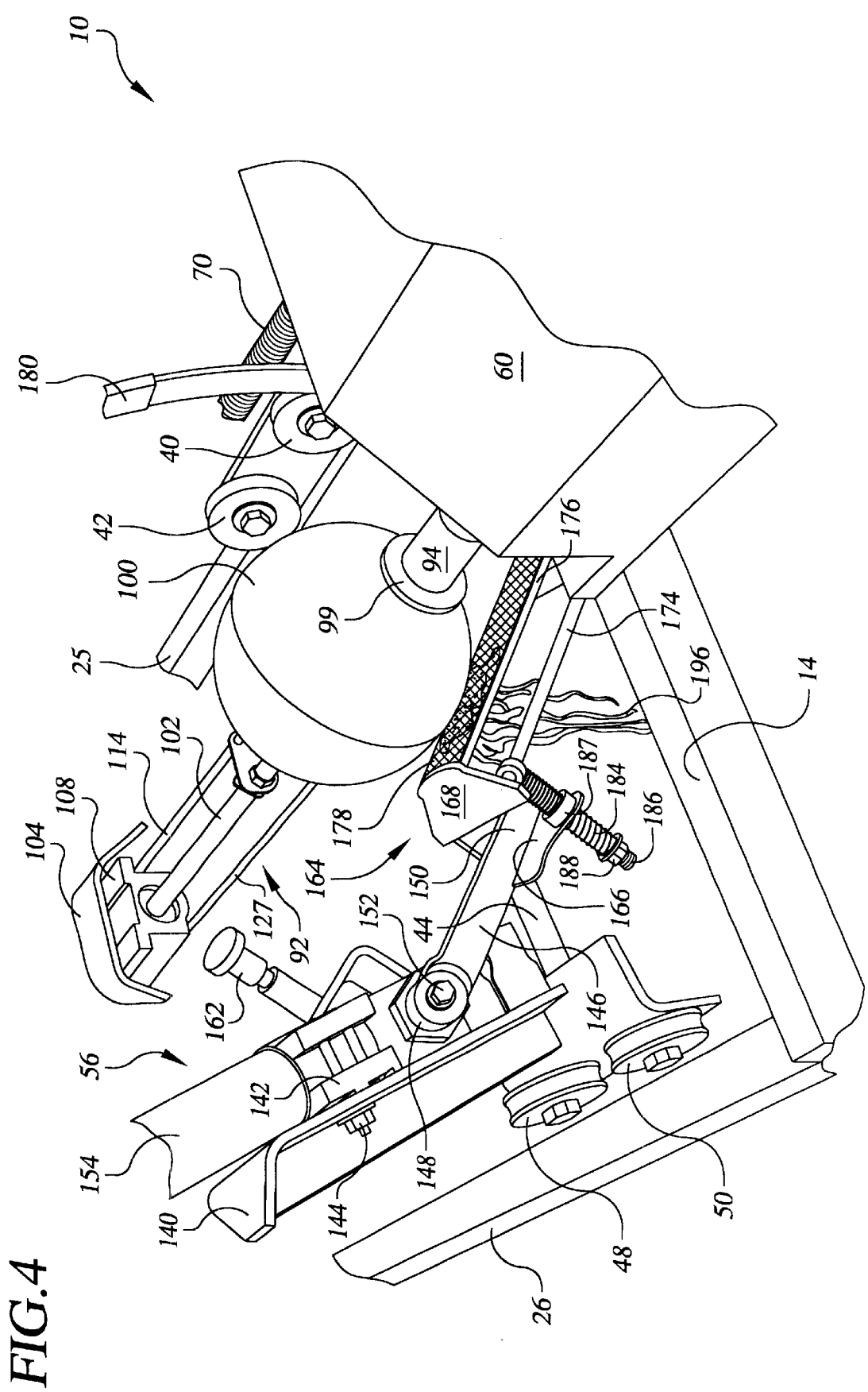
FIG. 4 is a fragmentary, perspective view of the automated peeler showing an articulating blade mount supporting a peeling blade of the automated peeler.

As shown in FIGS. 3 and 4, the peeler support 56 may be mounted to the back roller housing 46 by a peeler support flange 140 of the roller housing 46 by way of a mount bracket 142 and mount bolt and nut 144 assembly. The peeler support 56 includes a blade arm 146 having a first end 148 and an opposed second end 150. The first end 148 of the blade arm 146 is pivotally secured to a torsion driver 152 that pivots to drive the second end 15 of the blade arm 146 toward the split support axle 92. The torsion driver 152 may be a torsion driver means for pivoting the blade arm 146 toward the split support axle 92.

In a preferred embodiment, the torsion driver 152 is a pivot axle 152 of a spring-loaded, hydraulic actuator that provides a tensioned open position; that provides a forced closing movement; and, that also includes an adjustable force setting to adjust the force applied during the forced closing movement. An exemplary spring-loaded, hydraulic actuator is a standard door opener, wherein the blade arm 146 would be an arm extending between the door opener and a door or a door frame. An acceptable door opener is sold by the Ingersol Rand Company, of Princeton, Ill., U.S.A., under the trademark "SUPER SMOOTHEE", model 4041 series.

As best seen in FIGS. 3 and 4, the torsion driver pivot axle 152 protrudes from a cylindrical housing 154 having a force setting adjustment nut 156 extending out of the cylindrical housing 154. The torsion driver axle 152 may also include a lock-out disk 158 secured to the axle 152, for example, where the torsion driver axle 152 protrudes from an opposed side of the cylindrical housing 154, as shown in FIG. 3. The lock-out disk includes a notch 160 that mates with a spring-loaded, button plunger 162 secured to the cylindrical housing 154, so that the plunger 162 sits in the notch 160 to restrict movement of the torsion driver pivot axle 152. The spring-loaded, button plunger 162 biases the plunger into the notch 160 whenever the pivot axle 152 positions the notch adjacent to the plunger 162. An operator (not shown) must pull the button plunger 162 out of the notch in order to free up the torsion driver pivot axle 152 for movement.

Figure 6:
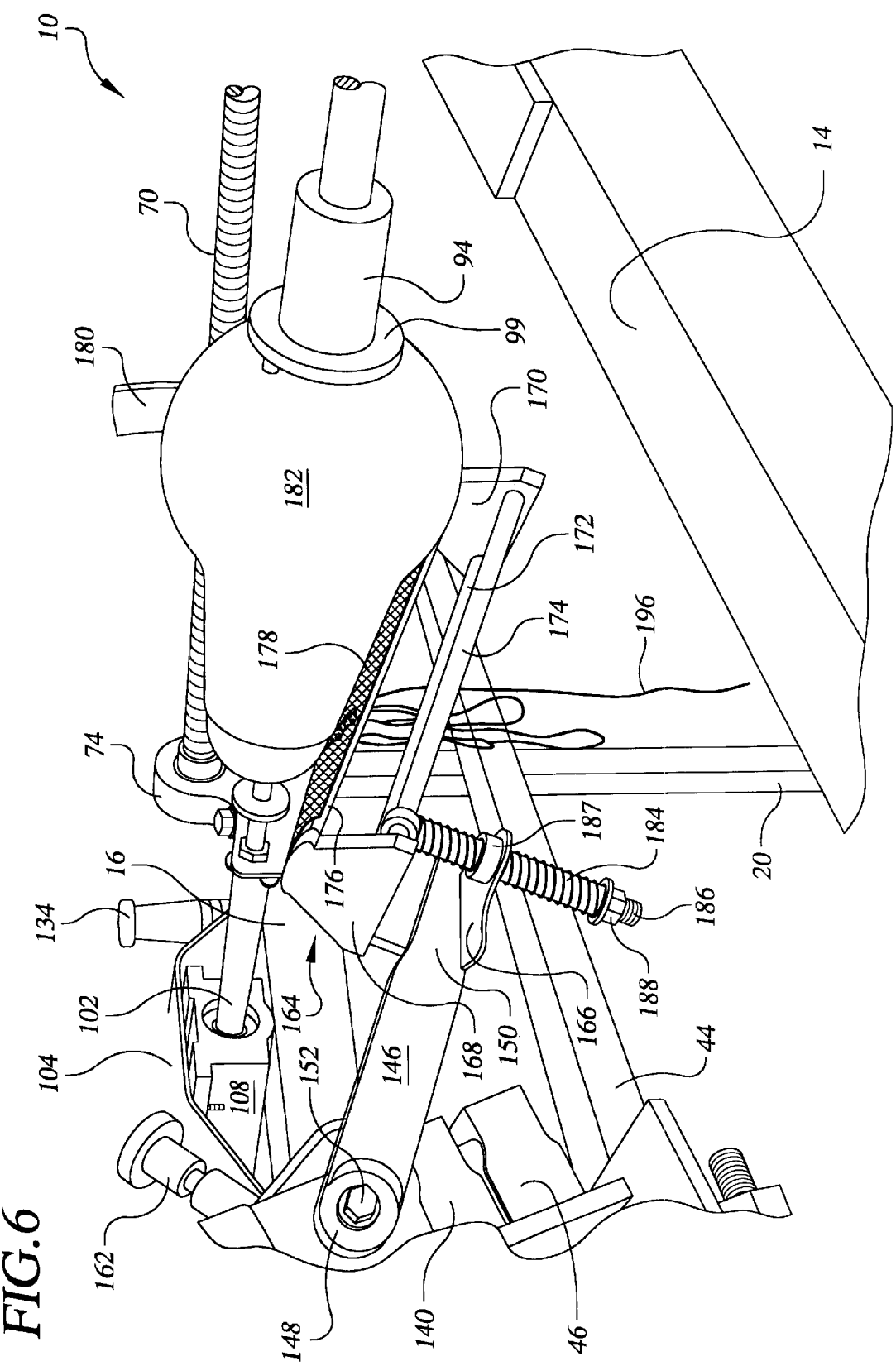
FIG. 6 is a fragmentary, perspective view of the FIG. 5 automated peeler showing the peeler peeling the butternut squash.

An articulating blade mount 164 is pivotally secured to the second end 150 of the blade arm 146 by a pivot bracket 166. As best shown in FIG. 6, the articulating blade mount 164 includes a first plate 168, an opposed second plate 170, a first connecting rod 172 and a second connecting rod 174 extending between and connecting the first plate 168 and second plate 170, and a blade support 176 extending between the first and second plates 168, 170 and above the first and second connecting rods 172, 174 to support a peeling blade 178. An operating handle 180 may be secured to the articulating blade mount 164, such as at the second plate 170, to facilitate positioning of the blade mount 164 and peeling blade 178.

The pivot bracket 166 secures the articulating blade mount 164 to the second end 150 of the blade arm 146 so that the articulating blade mount 164 may pivot or articulate about an axis defined as extending between the first end 148 and the second end 150 of the blade arm 146. By permitting the blade mount 164 to pivot about that axis, the peeling blade 178 may move to track an irregular contour of an irregular object to be peeled, such as a butternut squash 182 (shown in FIGS. 5 and 6). The articulating blade mount 164 may be tensioned to pivot from a starting position, to be depressed from the start position when tracking an irregular shape of the object being peeled 100, and to return to the start position, by any tensioning means known in the art for such pivoting of the articulating blade mount 164. The tensioning means may include simply a flexible pivot bracket 166 in the shape of an "L", so that only one side of the blade mount 164 is secured to the bracket and another side of the mount 164 may be moved by the flexure of the bracket, or any tensioning means known in the art for permitting such pivoting or articulation of the blade mount 164.

Figure 5:
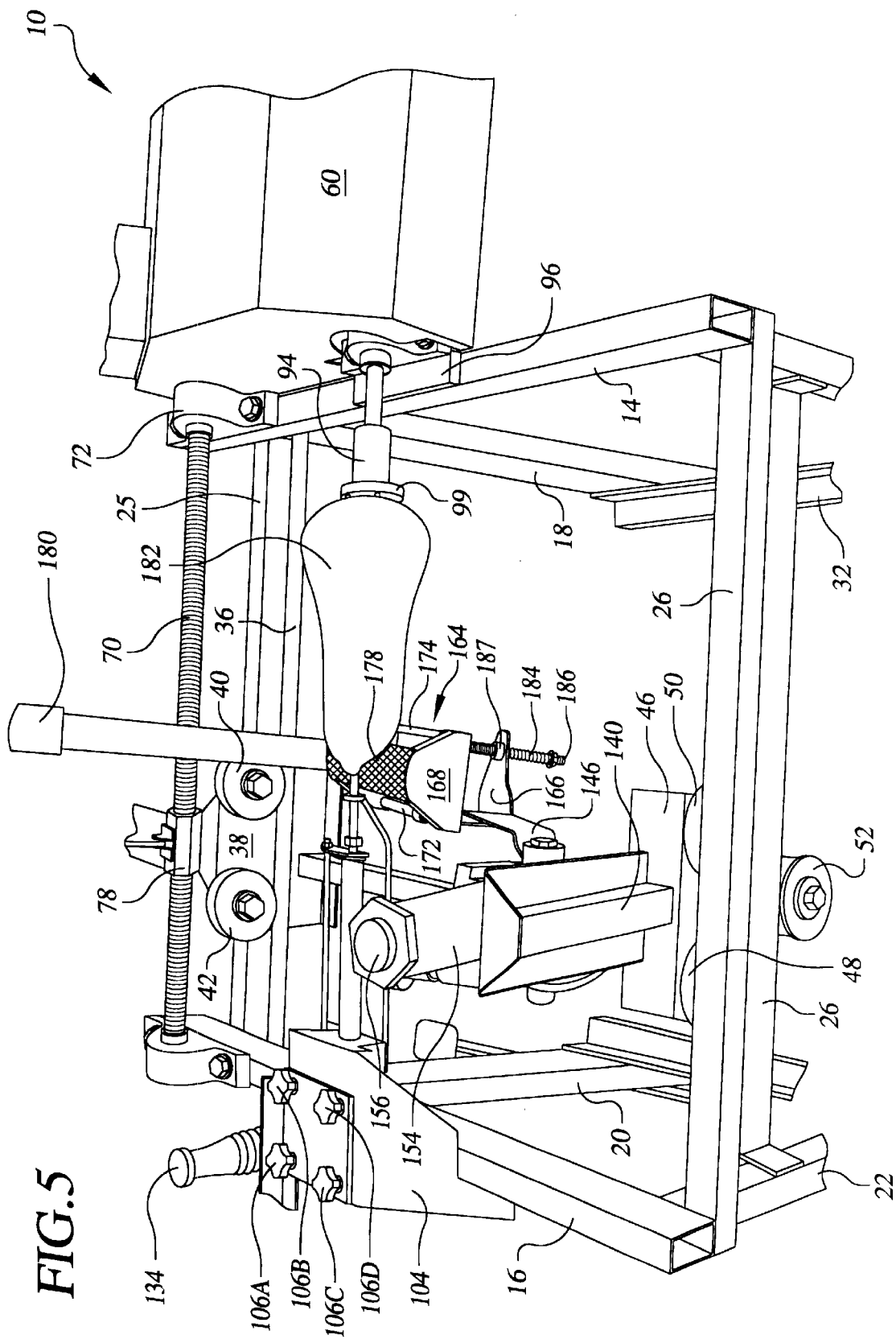
FIG. 5 is back perspective view of the FIG. 1 automated peeler showing the peeler securing a butternut squash.

As best shown in FIGS. 4, 5 and 6, the tensioning means may include a coil spring 184 surrounding a rod 186 passing from the second connecting rod 174 of the articulating blade mount 164 and through a spring collar 187 of the pivot bracket 166. A tension adjustment nut 188 on the rod 186 serves to compress the coil spring 184 in order to adjust the amount of resistance provided against pivoting movement of the articulating blade mount 164. As the mount 164 pivots, the coil spring 184 is compressed to resist pivoting of the mount 164, and to tension the mount 164 back toward the object being peeled 100. The sensitivity of movement of the articulating blade mount 164 may thereby be adjusted depending upon the toughness, or thickness of the skin of the object being peeled.

The peeling blade 178 may be any peeling blade means capable of peeling a rotating vegetable. A preferred peeling blade 178 is shown away from the automated peeler 10 in FIG. 7. The preferred peeling blade comprises an arcuate cutting surface 190 having at least one blade tip 192 extending above a throughbore 194 defined within the arcuate cutting surface 190 of the peeling blade 178 at a point that is a farthest distance from the articulating blade mount 164 and that is closest to the object to be peeled (100 in FIG. 4, 182 in FIGS. 5, 6). Therefore, as the object to be peeled 182 rotates within the split support axle 92 against the blade tip 192, a peel 196 (shown best in FIGS. 4 and 6) of the object 182 passes through the throughbore 194 defined in the arcuate cutting surface 190 of the blade 178. As shown best in FIGS. 4–6, the peeling blade 178 may be positioned relative to the objects being peeled 100, 182 so that gravity causes the peel 196 passing through the throughbore 194 to pass away from the peeling blade 178 and objects 100, 182 being peeled in the direction of the force of gravity.

Figure 7:
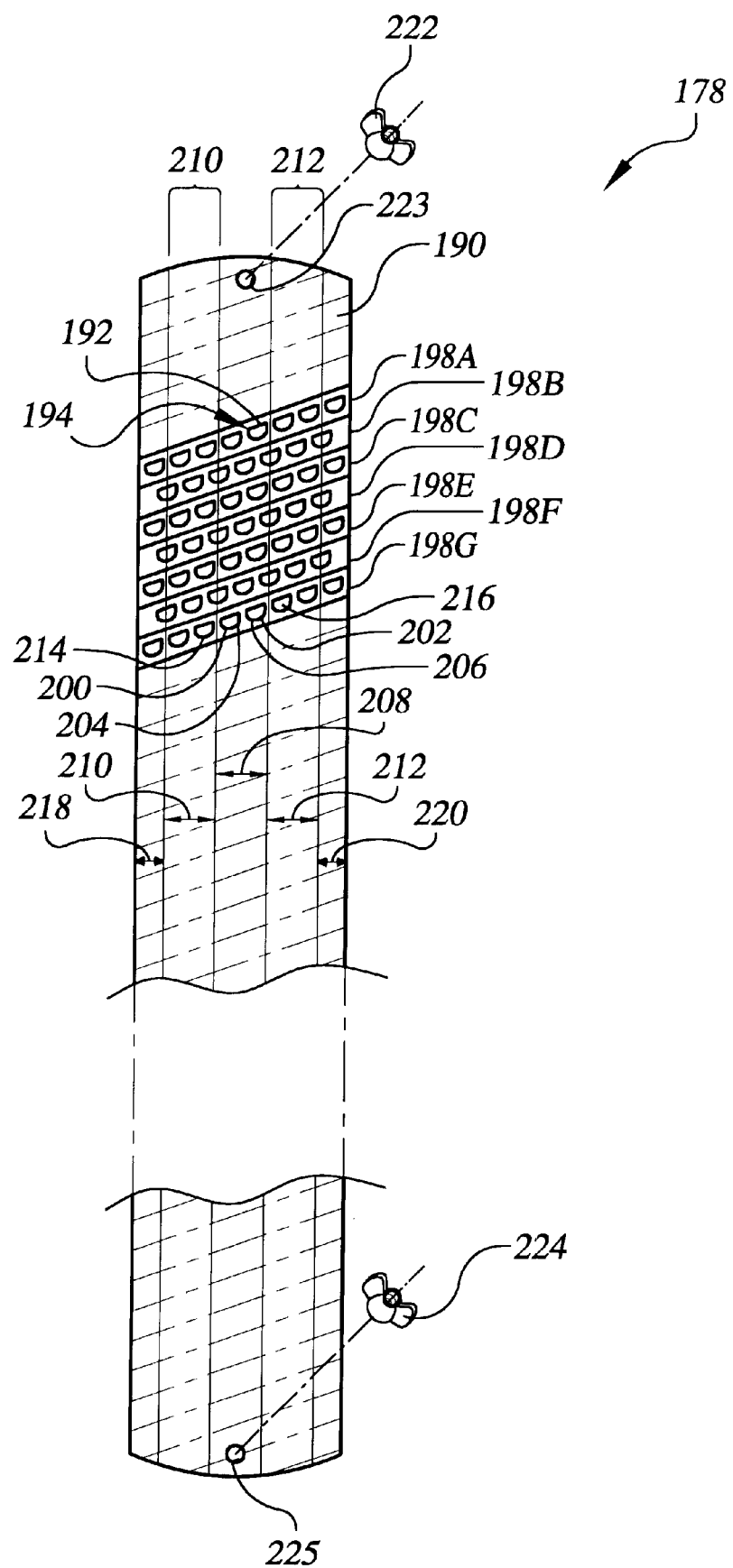
FIG. 7 is a fragmentary, schematic drawing of a preferred peeling blade suitable for the automated peeler of the present invention.

As best shown in FIG. 7, the peeling blade may include a plurality of rows 198A, 198B, 198C, 198D, 198E, 198F, 198G of blade tips 192, wherein one or two blade tips (e.g., 200, 202 in row 198G) extend above the throughbores 204, 206 to define a central ridge 208 of blade tips along the arcuate cutting surface 190 which central ridge 208 includes blade tips that are defined within the arcuate cutting surface 190 as farthest from the articulating blade mount 164 and closest to the object 100 or 182 to be peeled.

The peeling blade 178 also defines a first shoulder ridge 210 and a second shoulder ridge 212 parallel to and on opposed sides of the central ridge 208 of blade tips wherein the first and second shoulder ridges 210, 212 have no blade tips, and may define throughbores 214, 216. As the object 100 or 182 to be peeled rotates against the peeling blade 178, the blade tips 200, 202 in row 198G of the central ridge 208 peel the object, while the shoulder ridges 210, 212 contact the object being peeled thereby preventing the blade tips 200, 202 of the central ridge 208 from penetrating the object being peeled such as a turnip 100 or butternut squash 182 beyond a desired depth defined as a shortest distance between a farthest extension of the blade tips 200, 212 of the central ridge 208 from the arcuate cutting surface 190 defining the shoulder ridges 210, 212. It has been found by the inventor of the automated peeler 10 that an optimal desired depth is 0.022 inches, plus or minus ten per cent.

An exemplary peeling blade 178 may be a common carpenters half-round file blade, such as a file blade sold under the brand name or trademark "SURFORM", model number 5-21-299, sold by the Stanley Tools Company of New Britain, Conn., U.S.A., wherein the shoulder ridges 210, 212 are formed by filing down to a flat surface the blade tips adjacent the one or two central blade tips 200, 202 that define the central ridge 208 of blade tips. The peeling blade 178 may also include a first exterior ridge 218 of blade tips adjacent and parallel to the first shoulder ridge 210, and a second exterior ridge 220 of blade tips adjacent and parallel to the second shoulder ridge 212. The first and second exterior ridges 96, 98 of blade tips serve to further assist the peeling blade 178 in peeling an especially irregular surface of the object to be peeled, such as the butternut squash 182.

Additionally, the articulating blade mount 164 that secures the peeling blade 178 may be adjustable by way of standard securing means, such as by a first wing nut 222 passing through a first securing throughbore 223 defined within the peeling blade 178, and a second wing nut 224 passing through a second securing throughbore 225 secured to adjustable bolts (not shown) within the blade mount 164, so that after one or two rows (e.g., rows 198A, 198B) of blade tips are utilized and worn, the blade 178 may be moved along the blade mount 164 so that the next one or two rows of blade tips (e.g., 198C, 198D) are positioned to contact the object 100, 182 to be peeled. In this way, a standard half-round file may be adjusted approximately forty times to extend a useful life of the peeling blade 178.

In use of the automated peeler, the operating handle 180 is driven by the operator (not shown) so that the peeling blade 178 moves away from the split support axle 92, until the spring-loaded button plunger 162 inserts into the notch 160 of the lock-out disk 158, thereby restricting movement of the torsion driver pivot axle 152, and its affixed blade arm 146, articulating blade mount 164, and peeling blade 178. Then, the operator, depresses the foot pedal 122 to withdraw the second axle segment 102 away from the first axle segment 94. An object to be peeled, such as the butternut squash 182 shown in FIGS. 5 and 6, is then inserted onto the mount spikes 98A, 98B, 98C, 98D of the first axle segment 94, and the operator lets the foot pedal 122 upward so that the extension rod 114 of the spring cylinder 110 forces the second axle segment 102 and its securing spike 126 into the butternut squash 182 to secure the squash 182 within the split support axle 92.

The operator then uses the operating handle 180 to move the peeler carriage 34 toward either the first end 14 or second end 16 of the frame 12 to position the peeling blade 178 to be aligned with the point on the object being peeled 182 that is penetrated by the securing spike 126, as shown in FIG. 5. The operator then switches on the motor driver means 58 so that the split support axle 92 and the butternut squash 182 secured therein starts to rotate. Next, the operator pulls the button plunger 162 so that it moves out of the notch 160 of the lock-out disk 158 while holding the operating handle 180 in a stationery position to avoid an uncontrolled movement of the blade arm 146. The operator then gently moves the operating handle 180, permitting the driving force of the torsion driver pivot axle 152 to move the attached blade arm 146, articulating blade mount 164, and peeling blade 178 into contact with the butternut squash 182, as shown in FIG. 5.

Next, the operator moves the hand grip 83 of the split-nut clamp 76 toward its fixed arm 88 to close the first and second half cylindrical nuts 78, 80 onto the carriage screw 70. That causes the peeler support 56 to start moving toward the first end 14 of the frame, while the peeling blade 178 peels the butternut squash 182, and a peel 196 falls through the peeler blade 178 to be collected, as shown in FIG. 6. Whenever the peeler blade 178 reaches a predetermined end of the butternut squash adjacent the restriction collar 99 of the first axle segment 94, the auto-stop switch bar 89 impacts the auto-stop switch 91 on the motor housing 60, so that the carriage screw 70 and split support axle 92 stop rotating.

The operator then moves the operating handle 180 so that the peeling blade 178 moves away from the squash 182, and the coil spring of the button plunger 162 moves the plunger into the notch 160 of the lock-out disk 158 in order to lock the position of the peeler blade 178 away from the squash 182. The operator then depresses the foot pedal 122 to withdraw the second axle segment 102 and its securing spike 126 out of the object being peeled 182. The peeled squash 182 will then drop away from the split support axle 92 and out of the automated peeler 10, into the hand of the operator or some other storage apparatus. The automated peeler 10 is then ready to be re-loaded with another object to be peeled 100.

In a preferred embodiment, the automated peeler 10 includes an extension shaft (not shown) that can be mechanically coupled to by a common screw sleeve, or threaded collar, etc., to the first axle segment 94 to vary the effective useful length of the split support axle 92 without changing the more complex second axle segment 102. Similarly, the auto-stop switch actuator bar 89 may be adjusted, such as by a common wing-nut and threaded screw passing through a collar affixed to the front roller housing 38 into the bar 89, so that the automated peeler 10 may quickly, and easily be adjusted to accommodate any extension shaft secured to the first axle segment 94.

As is apparent, the automated peeler 10 provides for an efficient, inexpensive apparatus that can very quickly peel vegetables having irregular, tough, leathery, thick skins, such as butternut squash and turnips or rutabagas, without need for application of water to clean away peels or portions thereof and wetting of the peeled fruit; without need for high-speed, dangerous spinning peeling blades; and, with a very modest power requirement. It has been found that one person operating the automated peeler 10 may load and commence peeling of one butternut squash 182 as described above, and while the peeler 10 is peeling that squash 182, the operator may unload an object being peeled from another automated peeler, and re-load it, and then do the same for a third automated peeler, before returning to the first automated peeler 10 to unload the peeled butternut squash 182. In such a manner, a one-person operator may efficiently control three automated peelers to peel up to one-hundred and eighty, fourteen inch butternut squash per hour for maximum productivity.

While the present invention has been described and illustrated with respect to a particular construction and illustration of preferred embodiments of an automated peeler 10, it should be understood that the invention is not limited to the described and illustrated examples. For example, while the illustrated and described examples show an electric motor drive means 58 mechanically coupled to the rotating carriage screw 70 and split support axle 92, it is to be understood that alternative known motor means that can rotate the split support axle 92 and carriage screw 70, and that can move the peeler support 56 along the peeler carriage 34 are within the scope of the invention. Additionally, while the preferred peeling blade 178 having an arcuate surface 190 has been described, it is to be understood that any known or common peeling blade that can peel vegetables and can be secured to the articulating blade mount 164 is within the scope of the invention. Accordingly, reference should be made primarily to the attached claims rather than to the foregoing description to determine the scope of the invention.

What is claimed is:

1. An automated peeler for automatically peeling vegetables or fruit, comprising:
   a. a frame having a first end and an opposed second end;
   b. a peeler carriage supported by the frame extending between the first and second ends of the frame;
   c. a peeler support adjustably secured to the peeler carriage so that the peeler support may move between the first and opposed second ends of the frame;
   d. a split support axle rotatably secured between the first and second ends of the frame for supporting and rotating an object to be peeled;
   e. motor drive means mechanically coupled to the peeler carriage for selectively moving the peeler support along the peeler carriage, and mechanically coupled to the split support axle for rotating the object to be peeled; and,
   f. wherein the peeler support includes a blade arm having a first end and an opposed second end, the first end being adjustably secured to a torsion driver that drives the second end of the blade arm toward the split support axle, an articulating blade mount secured to the second end of the blade arm, the articulating blade mount being secured to the second end of the blade arm so that the blade mount may pivot about an axis defined as extending between the first and opposed second ends of the blade arm, and a peeling blade secured to the articulating blade mount; the peeler support and split support axle being cooperatively positioned so that whenever the peeler support is driven along the peeler carriage by the motor drive means, the peeling blade may be selectively positioned by the torsion driver to contact and peel the object to be peeled as the motor drive means rotates the split support axle and object to be peeled.

2. The automated peeler of claim 1, wherein the peeling blade is secured by the articulating blade mount to be under the object being peeled relative to a direction of gravity, and the peeling blade includes at least one blade tip extending above a throughbore defined within the peeling blade so that as the object to be peeled rotates within the split support axle against the blade tip, a peel of the object passes through the throughbore to drop by the force of gravity away from the peeling blade and the object being peeled.

3. The automatic peeler of claim 1, wherein the peeler support includes a tensioning means for permitting the articulating blade mount and peeling blade to be depressed from a start position and to return to the start position while tracking an irregular shape of the object to be peeled.

4. The automatic peeler of claim 3, wherein the tensioning means includes a coil spring surrounding a rod passing from the articulating blade mount through a pivot bracket that secures the articulating blade mount to the blade arm, wherein the rod includes a tension adjustment nut for compressing the coil spring along the rod to vary resistance of the coil spring to pivoting of the articulating blade mount and peeling blade as the peeling blade tracks an irregular surface of the object being peeled.

5. The automated peeler of claim 1, wherein the peeling blade includes an arcuate cutting surface having a plurality of rows of blade tips and in each row of blade tips at least one blade tip extends above at least one throughbore defined within the arcuate surface, and the peeling blade includes securing means for variably securing the peeling blade to the articulating blade mount so that differing rows of the plurality of rows of blade tips may be positioned to contact the object to be peeled.

6. The automated peeler of claim 1, wherein the split support axle includes a first axle segment rotatably secured to the first end of the frame and mechanically coupled to the motor drive means and a second axle segment retractably secured to the second end of the frame, wherein the second axle segment includes a biasing means for retractably driving the second axle segment toward the first axle segment.

7. The automated peeler of claim 6, wherein the biasing means comprises a spring cylinder mechanically coupled to the second axle segment having an extension rod biased to extend out of the spring cylinder, wherein the extension rod is secured to a cable that is secured to a foot pedal so that movement of the foot pedal in a direction of gravity compresses the compression rod against the bias of the spring cylinder into the cylinder and moves the second axle segment away from the first axle segment.

8. The automated peeler of claim 1, wherein the peeler carriage includes a carriage screw mechanically coupled to the motor drive means so that the motor drive means selectively rotates the carriage screw, and the peeler carriage includes a split-nut clamp including a first half cylindrical nut and a second half cylindrical nut which half cylindrical nuts define internal threads that mate with threads of the carriage screw, and which half cylindrical nuts are secured to a pivoting arm and an opposed fixed arm of a hand clamp so that movement of the arms of the hand clamp toward each other secures the two half cylindrical nuts onto the carriage screw to move the peeler carriage along the carriage screw between the first and second ends of the frame.

9. The automated peeler of claim 1, wherein the torsion driver comprises a pivot axle of a spring-loaded, hydraulic actuator, the pivot axle being secured to provide a forced pivoting of the blade arm toward the object to be peeled, and the pivot axle also including a lock-out disk secured to the pivot axle, the lock-out disk defining a notch that mates with a spring-loaded, button plunger secured to the actuator so that the button plunger restricts movement of the lock-out disk and pivot axle whenever the button plunger is within the notch, and permits movement of the pivot axle and lock-out disk whenever the button plunger is withdrawn from the notch.

10. An automated peeler for automatically peeling vegetables or fruit, comprising:

a. a frame having a first end and an opposed second end;

b. a peeler carriage supported by the frame extending between the first and second ends of the frame and;

c. a peeler support adjustably secured to the peeler carriage so that the peeler support may move between the first and opposed second ends of the frame;

d. a split support axle rotatably secured between the first and second ends of the frame for supporting and rotating an object to be peeled;

e. motor drive means mechanically coupled to a carriage screw of the peeler carriage for selectively moving the peeler support along the peeler carriage, and mechanically coupled to the split support axle for rotating the object to be peeled; and, f. wherein the peeler support includes a blade arm having a first end and an opposed second end, the first end being adjustably secured to a torsion driver that drives the second end of the blade arm toward the split support axle, an articulating blade mount secured to the second end of the blade arm, the articulating blade mount being secured to the second end of the blade arm so that the blade mount may pivot about an axis defined as extending between the first and opposed second ends of the blade arm, and a peeling blade secured to the articulating blade mount; the peeler support and split support axle being cooperatively positioned so that whenever the peeler support is driven along the peeler carriage by the motor drive means, the peeling blade may be selectively positioned by the torsion driver to contact and peel the object to be peeled as the motor drive means rotates the split support axle and object to be peeled.

11. The automated peeler of claim 10, wherein the peeling blade is secured by the articulating blade mount to be under the object being peeled relative to a direction of gravity, and the peeling blade includes at least one blade tip extending above a throughbore defined within the peeling blade so that as the object to be peeled rotates within the split support axle against the blade tip, a peel of the object passes through the throughbore to drop by the force of gravity away from the peeling blade and the object being peeled.

12. The automatic peeler of claim 11 wherein the peeler support includes a tensioning means for permitting the articulating blade mount and peeling blade to be depressed from a start position and to return to the start position while tracking an irregular shape of the object to be peeled.

13. The automatic peeler of claim 12, wherein the tensioning means includes a coil spring surrounding a rod passing from the articulating blade mount through a pivot bracket that secures the articulating blade mount to the blade arm, wherein the rod includes a tension adjustment nut for compressing the coil spring along the rod to vary resistance of the coil spring to pivoting of the articulating blade mount and peeling blade as the peeling blade tracks an irregular surface of the object being peeled.

14. The automated peeler of claim 13, wherein the peeling blade includes an arcuate cutting surface having a plurality of rows of blade tips and in each row of blade tips at least one blade tip extends above at least one throughbore defined within the arcuate surface and the peeling blade includes securing means for variably securing the peeling blade to the articulating blade mount so that differing rows of the plurality of rows of blade tips may be positioned to contact the object to be peeled.

15. The automated peeler of claim 14, wherein in each row of blade tips one or two blade tips extend above throughbores defined within the arcuate surfaces to define a central ridge of blade tips along the arcuate cutting surface, which central ridge includes blade tips that are farthest from the articulating blade mount and closest to the object to be peeled, and the peeling blade defines a first shoulder ridge and a second shoulder ridge parallel to and on opposed sides of the central ridge of blade tips wherein the first and second shoulder ridges have no blade tips.

16. The automated peeler of claim 15, wherein the peeler carriage includes a split-nut clamp including a first half cylindrical nut and a second half cylindrical nut which half cylindrical nuts define internal threads that mate with threads of the carriage screw, and which half cylindrical nuts are secured to a pivoting arm and an opposed fixed arm of a hand clamp so that movement of the arms of the hand clamp toward each other secures the two half cylindrical nuts onto the carriage screw to move the peeler carriage along the carriage screw between the first and second ends of the frame.

17. The automated peeler of claim 16, wherein the torsion driver comprises a pivot axle of a spring-loaded, hydraulic actuator, the pivot axle being secured to provide a forced pivoting of the blade arm toward the object to be peeled, and the pivot axle also including a lock-out disk secured to the pivot axle, the lock-out disk defining a notch that mates with a spring-loaded, button plunger secured to the actuator so that the button plunger restricts movement of the lock-out disk and pivot axle whenever the button plunger is within the notch, and permits movement of the pivot axle and lock-out disk whenever the button plunger is withdrawn from the notch.

\* \* \* \* \*